US012415371B2

(12) United States Patent
Inomata

(10) Patent No.: US 12,415,371 B2
(45) Date of Patent: Sep. 16, 2025

(54) PRINTER

(71) Applicant: TOSHIBA TEC KABUSHIKI KAISHA, Tokyo (JP)

(72) Inventor: Toshiya Inomata, Yokohama Kanagawa (JP)

(73) Assignee: TOSHIBA TEC KABUSHIKI KAISHA, Tokyo (JP)

( * ) Notice: Subject to any disclaimer, the term of this patent is extended or adjusted under 35 U.S.C. 154(b) by 288 days.

(21) Appl. No.: 18/183,969

(22) Filed: Mar. 15, 2023

(65) Prior Publication Data

US 2024/0308248 A1 Sep. 19, 2024

(51) Int. Cl.
*B41J 11/00* (2006.01)
*B41J 3/407* (2006.01)

(52) U.S. Cl.
CPC ......... *B41J 11/0045* (2013.01); *B41J 3/4075* (2013.01)

(58) Field of Classification Search
CPC ...... B41J 11/0095; B41J 3/4075; B41J 11/42; B41J 15/04; B41J 15/042; B41J 29/38; B41J 2/01; B41J 11/0045; B41J 13/10; B41J 11/0055; B41J 13/0009; B65H 2511/24; B65H 2301/331; B65H 7/10; B65H 5/36; B65H 5/00
USPC .................................... 347/16, 19, 101, 104
See application file for complete search history.

(56) References Cited

FOREIGN PATENT DOCUMENTS

| | | | |
|---|---|---|---|
| JP | 2004-345796 | | 12/2004 |
| JP | 2021014340 A | * | 2/2021 |

* cited by examiner

*Primary Examiner* — Jannelle M Lebron
(74) *Attorney, Agent, or Firm* — Amin, Turocy & Watson, LLP

(57) ABSTRACT

A printer according to an embodiment includes a conveyance guide, a printing section, a position sensor, an arithmetic section, and a setting section. The conveyance guide guides an end portion in the width direction of a print medium and determines a conveyance position in the width direction of the print medium. The printing section prints on the print medium. The position sensor outputs a signal, which changes in proportion to a position in the width direction of the conveyance guide, and detects the position in the width direction of the conveyance guide. The arithmetic section creates a linear function indicating a proportional relation between the position in the width direction of the conveyance guide and the output signals. The setting section calculates the position in the width direction of the conveyance guide using the linear function and sets a printing start position in the width direction.

15 Claims, 10 Drawing Sheets

PRINTER

FIELD

Embodiments described herein relate generally to, for example, a printer that prints a barcode or the like on a long print medium.

BACKGROUND

There has been a printer that conveys a long print medium in a longitudinal direction and prints a barcode or the like on the print medium. The printer of this type includes, for example, a pair of conveyance guides that guides both the ends of the print medium in a width direction orthogonal to a conveyance direction. The pair of conveyance guides defines a conveyance position in the width direction of the print medium and conveys the print medium at center reference. The distance between the pair of conveyance guides can be adjusted according to the width of the print medium.

In contrast, there has also been a printer that puts a long print medium on one end side in the width direction of the print medium and conveys the print medium at side reference. The side-reference printer conveys the print medium with one end in the width direction of the print medium set in contact with a conveyance reference surface. Therefore, the side-reference printer includes one conveyance guide in a position opposed to the conveyance reference surface across a conveyance path for the print medium. The one conveyance guide can be adjusted, according to the width of the printing medium, in a direction separating from and coming into contact with the conveyance reference surface and guides the other end of the print medium.

In the printer that conveys the print medium at the side reference, since the conveyance position of one end in the width direction of the print medium is determined by the conveyance reference surface, a printing start position in the width direction is always fixed even if a print medium having different width is set in the printer. In contrast, in the printer that conveys the print medium at the center reference, since a conveyance position of both the ends in the width direction of the print medium changes according to the width of the print medium, a printing start position in the width direction also needs to be changed according to the width of the print medium. Therefore, in the center-reference printer, it is necessary to input the width of the print medium and set the printing start position in the width direction before a print start.

In general, in the center-reference printer, after the print medium is set, the position in the width direction of the conveyance guides is adjusted according to both the ends of the print medium, and the position in the width direction of the conveyance guides after the position adjustment is detected by a sensor. The width of the print medium is determined based on a result of the detection and the printing start position in the width direction for the print medium is automatically set.

However, since the center-reference printer moves the pair of conveyance guides to be separated from and brought into contact with each other, fluctuation more easily occurs in the conveyance position in the width direction of the print medium compared with the side-reference printer. If small gaps are provided between the print medium and the conveyance guides to prevent the conveyance guides from hindering conveyance of the print medium, the fluctuation in the conveyance position in the width direction of the print medium further increases. Further, the sensor that detects the position in the width direction of the conveyance guides has an individual difference. Accordingly, in the center-reference printer, it is likely that the conveyance position in the width direction of the print medium is unstable and the printing start position in the width direction greatly deviates.

DETAILED DESCRIPTION

A printer according to an embodiment includes a conveyance guide, a printing section, a position sensor, an arithmetic section, and a setting section. The conveyance guide is movable in a width direction orthogonal to a conveyance direction of a print medium and guides an end portion in the width direction of the print medium and determines a conveyance position in the width direction of the print medium. The printing section prints on the print medium guided by the conveyance guide and conveyed in the conveyance direction. The position sensor outputs a signal, which changes in proportion to a position in the width direction of the conveyance guide, and detects the position in the width direction of the conveyance guide. The arithmetic section creates, based on a first output signal of the position sensor at a time when the conveyance guide is disposed in a first position in the width direction and a second output signal of the position sensor at a time when the conveyance guide is disposed in a second position different from the first position in the width direction, a linear function indicating a proportional relation between the position in the width direction of the conveyance guide and the output signals of the position sensor. The setting section calculates, from the output signals of the position sensor, the position in the width direction of the conveyance guide using the linear function created by the arithmetic section and sets, based on the calculated positions, a printing start position in the width direction by the printing section for the print medium.

A label printer 100 according to an embodiment is explained below with reference to the drawings. The label printer 100 is an example of the printer described in the claims of this application. In the following explanation, in a state illustrated in FIG. 1 in which the label printer 100 is installed on a horizontal table, up-down, left-right, front-rear directions of the label printer 100 viewed from an arrow direction are defined.

Figure 1:
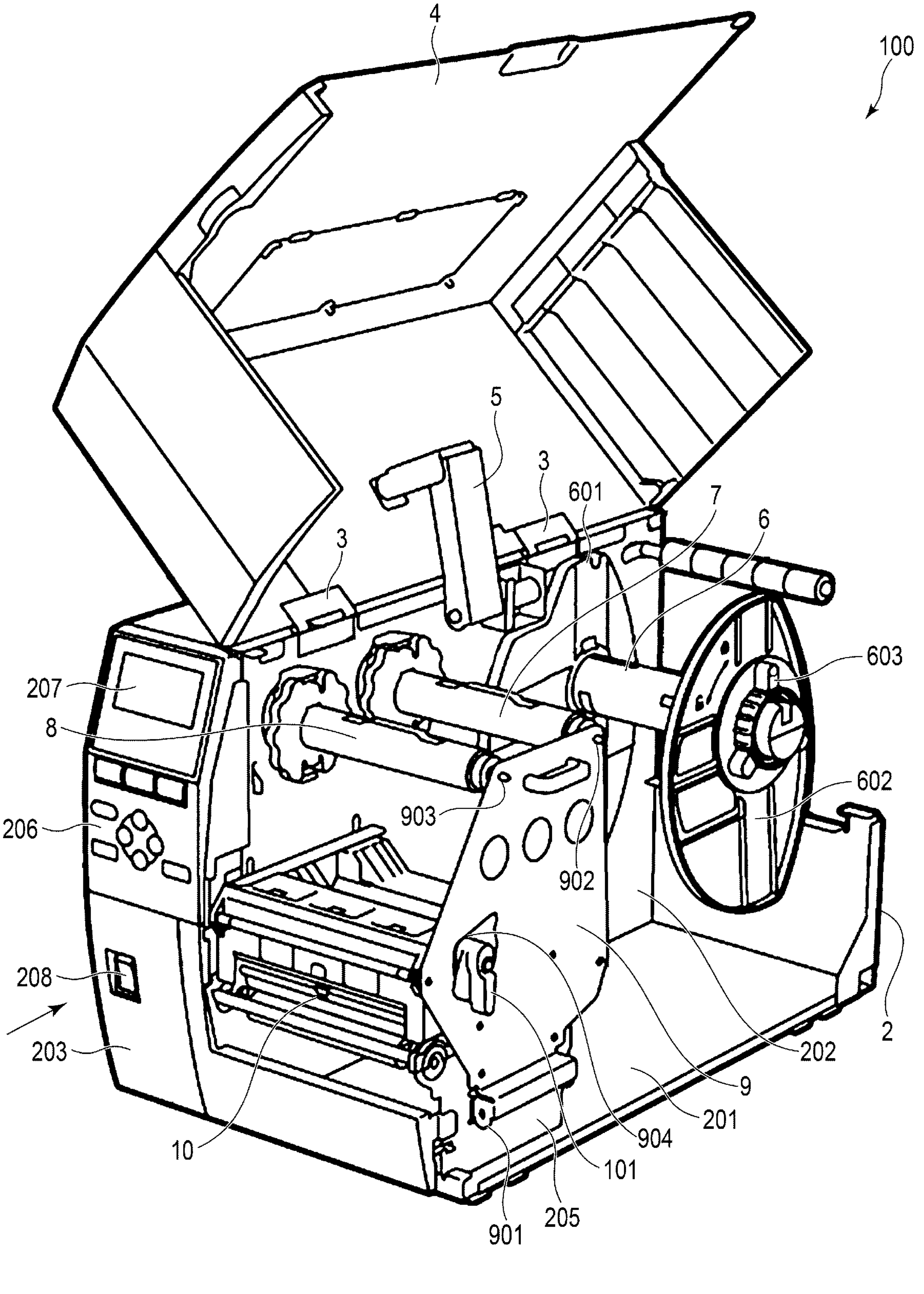
FIG. 1 is a schematic diagram illustrating a label printer according to an embodiment.

As illustrated in FIG. 1, the label printer 100 includes a housing 2 and a cover 4. The housing 2 includes a bottom wall 201, a vertical wall 202 erected upward from the bottom wall 201, a front wall 203 connected to the front end of the bottom wall 201 and the front end of the vertical wall 202, and a horizontal wall 204 (FIGS. 4 to 6) for fixing a conveyance guide unit 30 explained below. The bottom wall 201 is parallel to the table on which the label printer 100 is placed. The vertical wall 202 is erected upward from the upper surface of the bottom wall 201 and extends along a surface orthogonal to the left-right direction. The front wall 203 extends along a surface orthogonal to the front-rear direction. The horizontal wall 204 is parallel to the front wall 203 and is present in a position separated to the rear of the front wall 203.

The cover 4 is turnably connected to the upper end of the vertical wall 202 of the housing 2 via two hinges 3 including a turning shaft extended to the front and the rear. The cover 4 is turnable between an open position illustrated in FIG. 1 where a mechanism section of the label printer 100 is opened and a closed position where the mechanism section is covered. A damper 5 for smoothing an opening and closing motion of the cover 4 is present between the cover 4 and the vertical wall 202 of the housing 2. The label printer 100 has a substantially rectangular block-like external shape in a state in which the cover 4 is closed.

The front wall 203 of the housing 2 includes an operation and input section 206, a display section 207, and a power switch 208. For example, the length in a width direction orthogonal to the longitudinal direction of the label paper 121 is input to the operation and input section 206 as information concerning label paper 121 (FIG. 7) used in the label printer 100. The operation and input section 206 is an example of the input section described in the claims of this application. The display section 207 displays information such as a position in the width direction of guide members 31 and 32 explained below and a printing start position in the width direction for the label paper 121.

The label printer 100 includes a supply shaft 6 to which a label paper roll 12 (FIG. 7) is attached, a feeding shaft 7 to which a ribbon roll obtained by winding an ink ribbon before use in a roll shape is attached, a winding shaft 8 to which a ribbon roll obtained by winding the ink ribbon after the use is attached, and a printing unit 10. The printing unit 10 is an example of the printing section described in the claims of this application. The vertical wall 202 of the housing 2 fixes one ends of the supply shaft 6, the feeding shaft 7, and the winding shaft 8. That is, the vertical wall 202 holds the three shafts 6 to 8 in a cantilever state in a state in which the three shafts 6 to 8 are extended in the left-right direction.

A fixing plate 9 is present in a position opposed to the end portions on the right side of the feeding shaft 7 and the winding shaft 8 separated from the vertical wall 202. The fixing plate 9 is turnably connected to, via a hinge 901, a supporting plate 205 erected upward from the bottom wall 201 of the housing 2. The supporting plate 205 turnably supports the fixing plate 9 between an illustrated fixing position that lies along a surface orthogonal to the left-right direction and a fixing release position illustrated in FIG. 7. The fixing plate 9 includes a receiving hole 902 that receives the distal end of the feeding shaft 7 in an illustrated state in which the fixing plate 9 turns to the fixing position and a receiving hole 903 that receives the distal end of the winding shaft 8. The fixing plate 9 includes an insertion hole 904 through which a lock lever 101 for locking the printing unit 10 in an actuation position is inserted.

The label paper roll 12 is obtained by winding long belt-like label paper 121 in a roll shape. The label paper 121 is obtained by pasting a plurality of labels 123 side by side on one surface of a long mount 122. The label 123 includes an adhesive layer on a surface on the mount 122 side, can be pasted to and removed from the mount 122, and can be pasted to another object after being peeled from the mount 122. The label paper roll 12 is obtained by winding the label paper 121 on a tubular core material in a direction in which the surface of the mount 122 on which the label 123 is pasted is on the inner side. The label paper 121 is an example of the print medium described in the claims of this application. The print medium is not limited to the label paper 121 and may be, for example, belt-like heat sensitive paper.

The ribbon roll is obtained by winding a long ribbon in a roll shape. The ink ribbon holds ink to be transferred to the label paper 121 by heat. The ribbon roll before use is obtained by winding the ink ribbon before transfer of the ink on a tubular shaft section. The diameter of the ribbon roll decreases if the ribbon roll is used. The ribbon roll after the use is obtained by winding the ink ribbon after the transfer of the ink with the tubular shaft section. The diameter of the ribbon roll gradually increases. The two ribbon rolls on the feeding side and the winding side may be integrally provided as a ribbon cassette.

The supply shaft 6 includes, near both the ends in the longitudinal direction thereof, two hold plates 601 and 602 that are respectively in contact with both the end faces in the axial direction of the label paper roll 12. The hold plate 601 on the left side close to the vertical wall 202 is movable to the left and the right in the longitudinal direction of the supply shaft 6. The hold plate 601 determines an attachment position in the axial direction of the label paper roll 12 to match the center in the axial direction of the label paper roll 12 to a center surface of the label printer 100. The center surface of the label printer 100 is an imaginary flat surface extending in the front-rear direction and the up-down direction that passes the center in the left-right direction of the printing unit 10. In the following explanation, the imaginary surface is referred to as center surface of the label printer 100. The hold plate 602 on the right side separated from the vertical wall 202 is also movable to the left and the right along the longitudinal direction of the supply shaft 6. The hold plate 602 is fixed by a fixture 603 in any position that lies along the supply shaft 6.

Figure 7:
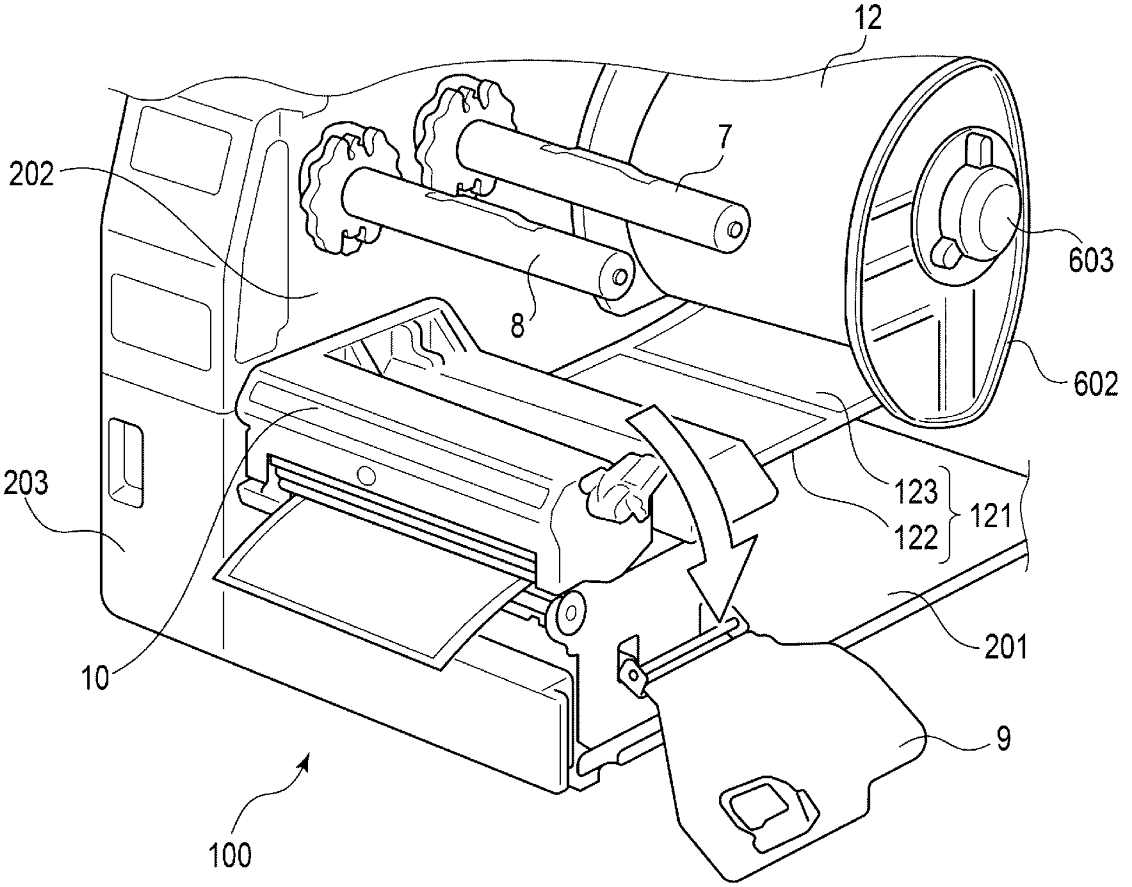
FIG. 7 is a diagram for explaining the procedure for attaching the label paper to the label printer.

If the label paper roll 12 is attached to the supply shaft 6, the label paper roll 12 is attached to the supply shaft 6 in a state in which the hold plate 602 on the right side is detached from the supply shaft 6. A direction in which the label paper roll 12 is attached is a direction in which the label paper 121 is drawn out in the direction of the printing unit 10 from the lower end side of the label paper roll 12 as illustrated in FIG. 7. After the label paper roll 12 is attached to the supply shaft 6, the hold plate 602 is attached to the supply shaft 6. The positions in the axial direction of the two hold plates 601 and 602 are adjusted such that the center in the axial direction of the label paper roll 12 is located on the center surface of the label printer 100. The label paper roll 12 is positioned in the axial direction by the pair of hold plates 601 and 602.

If the ribbon rolls (or the ribbon cassette) are attached, the fixing plate 9 is opened to the fixing release position (FIG. 7) and the ribbon rolls are respectively attached to the feeding shaft 7 and the winding shaft 8. The ink ribbon present between the feeding shaft 7 and the winding shaft 8 is disposed via a thermal head 11 (FIG. 8) of the printing unit 10. After the ribbon rolls are attached, the fixing plate 9 is turned to a fixing position illustrated in FIG. 1, the distal end of the feeding shaft 7 is inserted through the receiving hole 902, the distal end of the winding shaft 8 is inserted through the receiving hole 903, the lock lever 101 is inserted through the insertion hole 904, and the lock lever 101 is turned to a lock position.

The printing unit 10 is turnably connected to the right side surface of the vertical wall 202 of the housing 2 via a hinge mechanism. A turning shaft of the hinge mechanism extends in the front-rear direction. The printing unit 10 is extended in the left-right direction orthogonal to a conveyance direction of the label paper 121. The printing unit 10 is turnable between an actuation position illustrated in FIG. 1 and a retracted position illustrated in FIG. 4. The printing unit 10 includes a thermal head on the lower surface side thereof. The thermal head is disposed on the opposite side of the label paler 121 of the ink ribbon. A platen roller 13 (FIGS. 4 to 6) is present in a position opposed to the thermal head across the label paper 121 and the ink ribbon in a state in which the printing unit 10 is disposed in the actuation position illustrated in FIG. 1. In the state in which the printing unit 10 is disposed in the actuation position, the printing unit 10 presses the ink ribbon against the label paper 121 with the thermal head and thermally transfers the ink of the ink ribbon to the label paper 121. The printing unit 10 prints a two-dimensional barcode or the like on the label 123 of the label paper 121.

Figure 2:
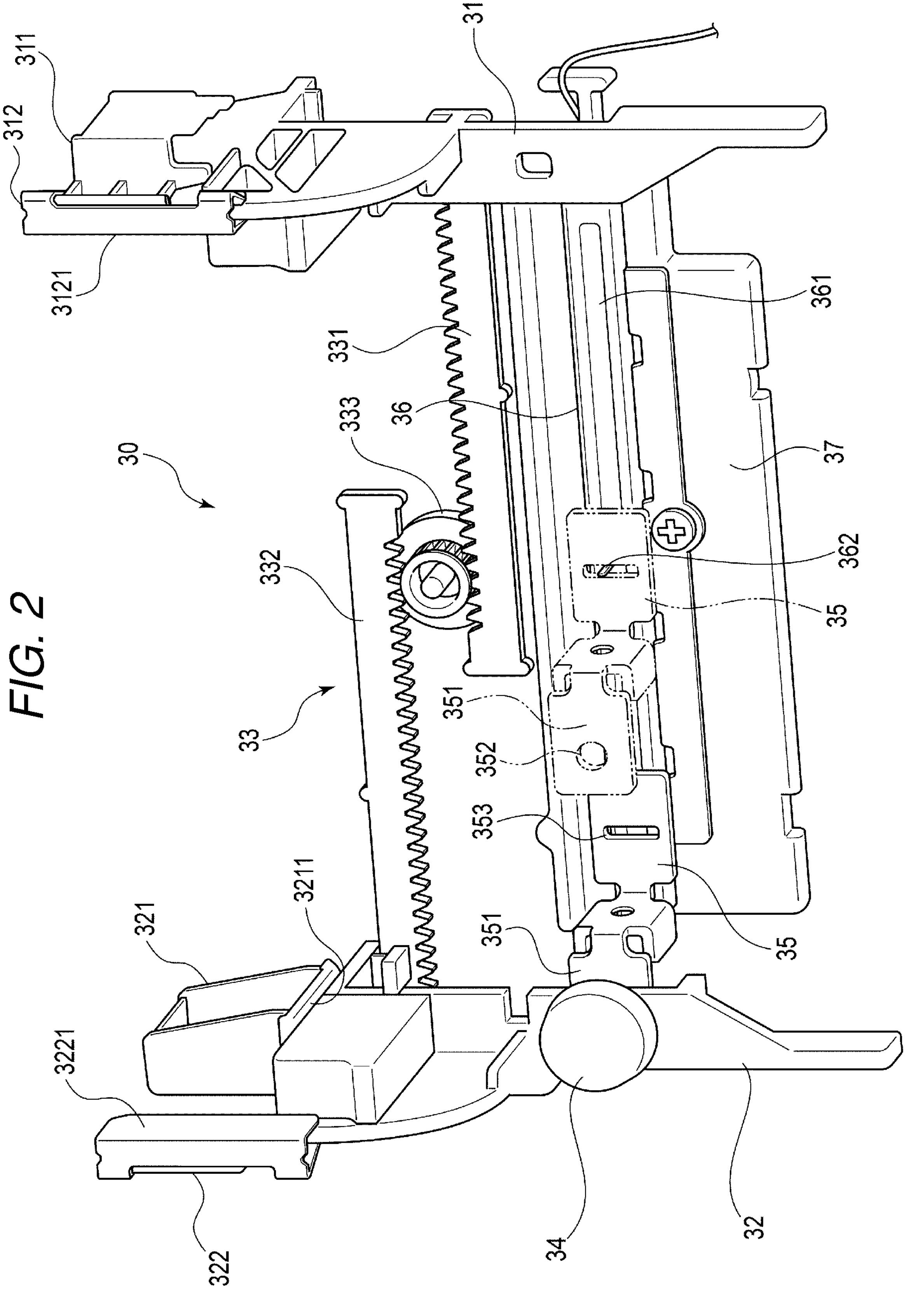
FIG. 2 is a perspective view illustrating a conveyance guide unit of the label printer illustrated in FIG. 1.

The label printer 100 includes a conveyance guide unit 30 illustrated in FIG. 2 between the supply shaft 6 and the printing unit 10. The conveyance guide unit 30 is present in a position closer to at least the printing unit 10 than the circumferential surface of the label paper roll 12 attached to the supply shaft 6. The conveyance guide unit 30 is not illustrated in FIG. 1. FIG. 2 is diagram of the conveyance guide unit 30 viewed from the rear of the label printer 100 (from the supply shaft 6 side).

As illustrated in FIG. 2, the conveyance guide unit 30 includes a pair of guide members 31 and 32 opposed to be separated from each other on the left and the right across a conveyance path of the label paper 121 drawn out from the label paper roll 12 attached to the supply shaft 6. The guide members 31 and 32 are extended in the up-down direction. One guide member 31 is present on the left side (in FIG. 2, the right side) close to the vertical wall 202. The other guide member 32 is present in a position separated in the right direction (in FIG. 2, the left direction) from the vertical wall 202. The guide members 31 and 32 are attached to be movable to the left and the right with respect to the horizontal wall 204 (FIGS. 4 to 6) of the housing 2. In FIG. 2, the horizontal wall 204 is not illustrated. The pair of guide members 31 and 32 is an example of the conveyance guide described in the claims of this application.

The pair of guide members 31 and 32 is concurrently moved in the left-right direction by a rack and pinion mechanism 33. The rack and pinion mechanism 33 includes a rack 331 extended in the right direction from a halfway portion in the up-down direction of the guide member 31 on the left side, a rack 332 extended in the left direction from a halfway portion in the up-down direction of the guide member 32 on the right side, and a pinion 333 that mashes with the two racks 331 and 332. The racks 331 and 332 have lengths vertically overlapping across the pinion 333. The pinion 333 includes a turning shaft extending in the front-rear direction and turnably attached to the housing 2. The pair of guide members 31 and 32 is openable and closable in the left-right direction centering on the center surface of the label printer 100 by the rack and pinion mechanism 33. Since the rack and pinion mechanism 33 is the well-known technique for those skilled in the art, detailed explanation of the rack and pinion mechanism 33 is omitted.

The horizontal wall 204 of the housing 2 includes a slit 2041 (FIGS. 4 and 5) through which a fixing screw 34 for fixing the guide member 32 on the right side to the horizontal wall 204 is slidably inserted. The slit 2041 pierces through the horizontal wall 204 in the front-rear direction and extends in the left-right direction, which is a moving direction of the guide members 31 and 32. The guide member 32 includes an insertion hole through which the fixing screw 34 is inserted. The fixing screw 34 fixes, with joint fastening, a proximal end portion 351 of an arm 35, which is formed by a sheet metal, to the horizontal wall 204 together with the guide member 32.

The arm 35 includes, in the proximal end portion 351 thereof, an insertion hole 352 through which the fixing screw 34 is inserted. A nut with which the fixing screw 34 is screwed is fixed on the front surface of the insertion hole 352. The distal end of the arm 35 is connected to a position sensor 36 explained below. In FIG. 2, the arm 35 is indicated by a solid line and indicated by a broken line. The solid line indicates the arm 35 in the case in which the pair of guide members 31 and 32 is fully opened. The broken line indicates the arm 35 in the case in which the pair of guide members 31 and 32 is fully closed. The arm 35 is an example of the coupling member described in the claims of this application.

Figure 4:
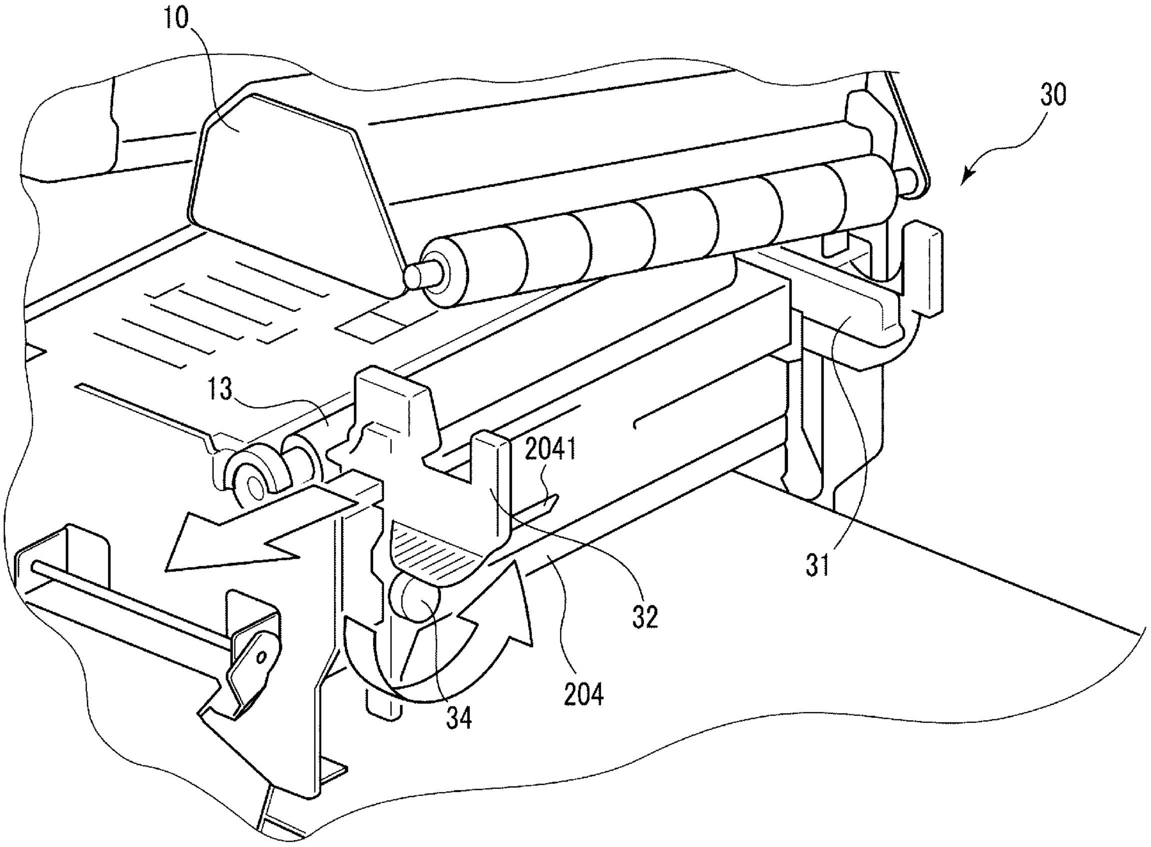
FIG. 4 is a diagram for explaining a procedure for attaching label paper to the label printer.
Figure 5:
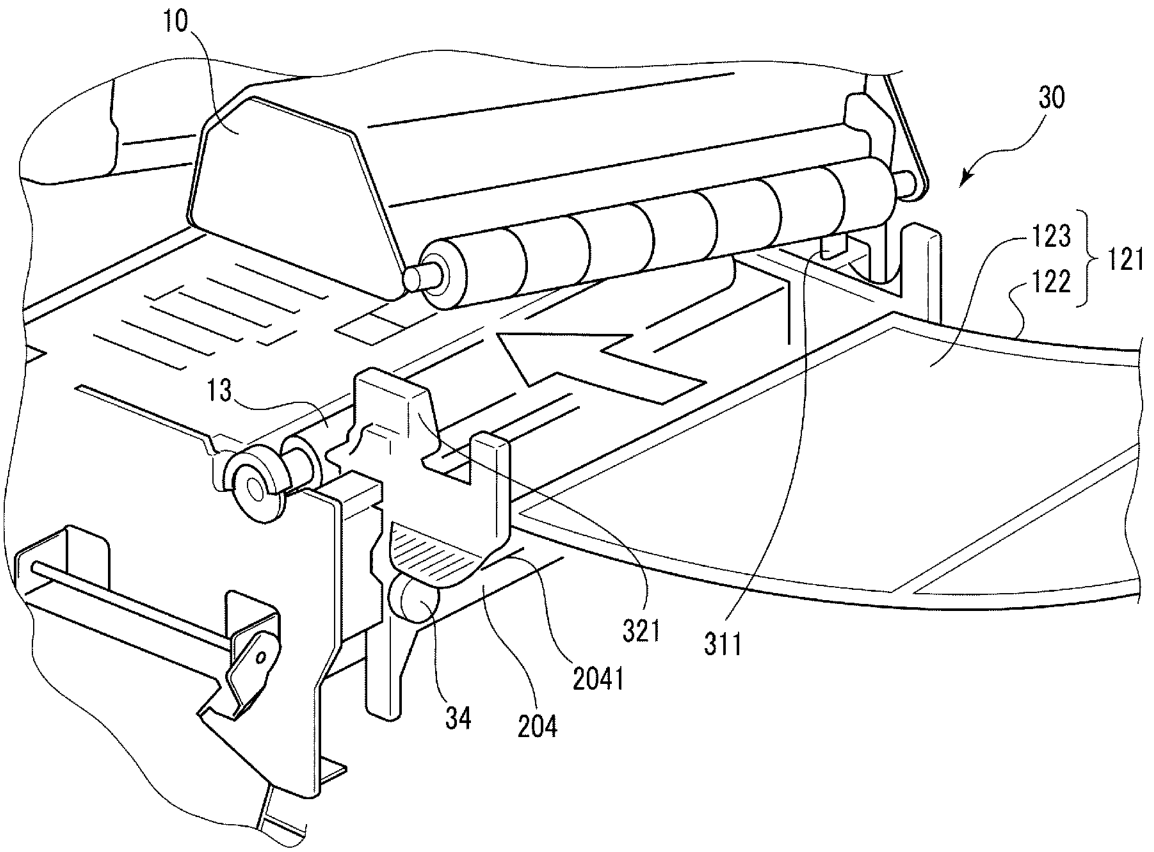
FIG. 5 is a diagram for explaining the procedure for attaching the label paper to the label printer.
Figure 6:
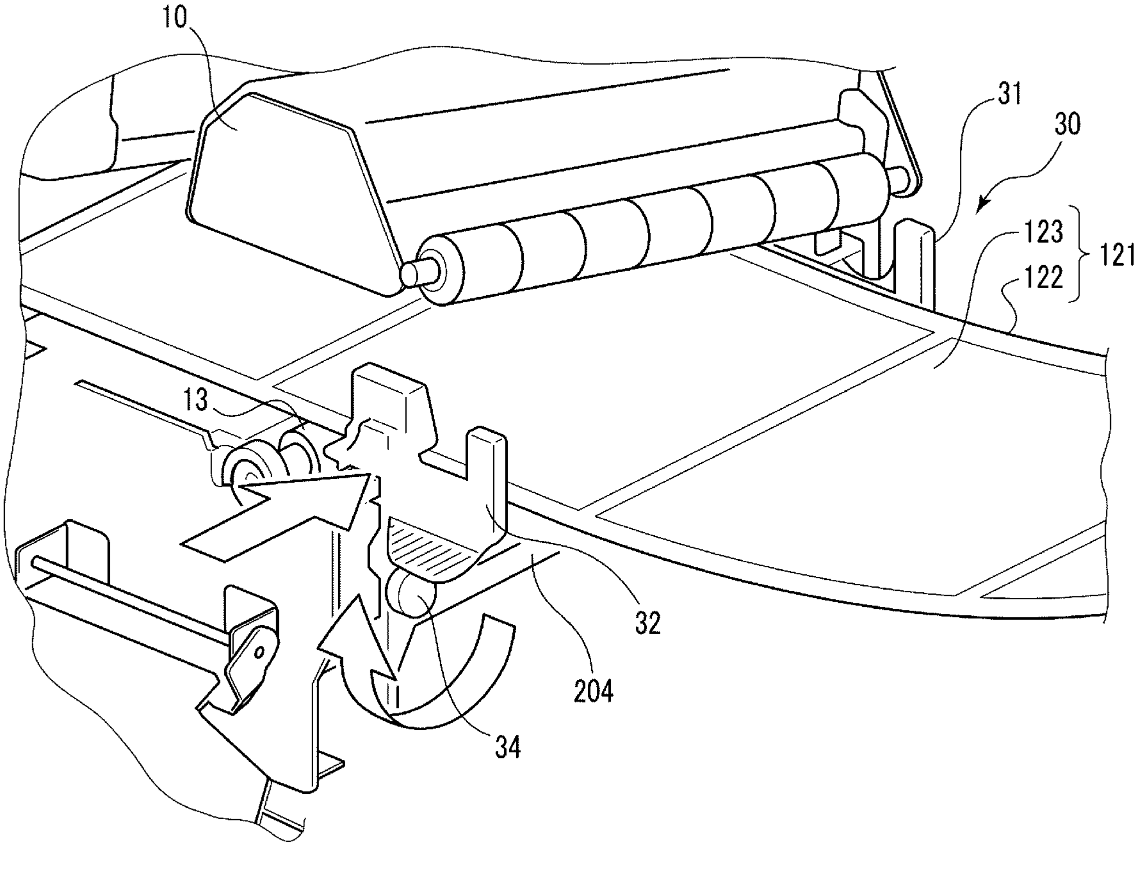
FIG. 6 is a diagram for explaining the procedure for attaching the label paper to the label printer.

The pair of guide members 31 and 32 is openable and closable in the left-right direction by the rack and pinion mechanism 33 based on the center surface of the label printer 100. The pair of guide members 31 and 32 adjusts an opening and closing width to match the length in the width direction orthogonal to the conveyance direction of the label paper 121 that passes between the pair of guide members 31 and 32. Since the pair of guide members 31 and 32 is coupled by the rack and pinion mechanism 33, one guide member moves in association with a movement of the other guide member. Therefore, the pair of guide members 31 and 32 can be fixed by fastening and fixing the guide member 32 on the right side to the horizontal wall 204 with the fixing screw 34 explained above. At the same time, the fixing screw 34 fixes the arm 35 to the horizontal wall 204. In FIGS. 4 to 6, the arm 35 is hidden behind the horizontal wall 204 and unseen.

A position sensor 36 for detecting the position in the width direction of the guide member 32 on the right side is present between the pair of guide members 31 and 32. The position sensor 36 is extended in the left-right direction and fixed to a sheet metal 37 disposed in parallel to the horizontal wall 204 in the front of the horizontal wall 204. The sheet metal 37 is fixed to the housing 2. The position sensor 36 includes a slider pin 362 projecting to the rear via a slit 361 extended in the left-right direction. The slider pin 362 is movable to the left and the right along the slit 361. A movable range of the slider pin 362 covers an entire movable range between the fully opened position and the fully closed position of the pair of guide members 31 and 32.

The position sensor 36 is a component of the conveyance guide unit 30 and is in close contact with the pair of guide members 31 and 32. The conveyance guide unit 30 is in close contact with the printing unit 10 in a degree in which a movable range of the conveyance guide unit 30 and a movable range of the printing unit 10 do not interfere with each other. That is, the position sensor 36 is in close contact with the rear of the printing unit 10.

The arm 35 includes the proximal end portion 351 fixed to the guide member 32 on the right side and extends in the left direction. The arm 35 includes, near the distal end thereof, a slit 353 that receives the slider pin 362 of the position sensor 36. The slit 353 pierces through the distal end of the arm 35 and extends in the up-down direction. If the guide member 32 on the right side moves in the left-right direction and the arm 35 moves in the left-right direction, the slider pin 362 of the position sensor 36 received in the slit 353 moves along the slit 361.

Figure 3:
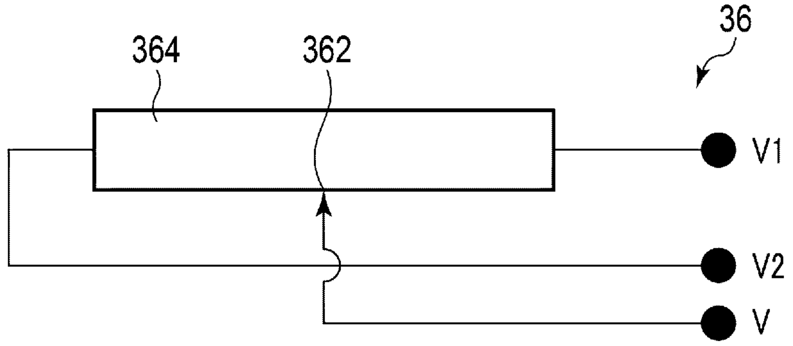
FIG. 3 is a circuit diagram of a position sensor illustrated in FIG. 2.

The position sensor 36 detects the position in the left-right direction of the slider pin 362. As illustrated in FIG. 3, the position sensor 36 includes a long resistor 364 extended in the left-right direction. Voltages V1 and V2 are applied to both ends of the resistor 364. The position sensor 36 outputs, as position information of the slider pin 362, a voltage V that changes according to movement of the slider pin 362 conducted halfway in the longitudinal direction of the resistor 364. The slider pin 362 is an example of the contactor described in the claims of this application.

The guide members 31 and 32 respectively include pressing blocks 311 and 321 and guide plates 312 and 322. For example, the pressing block 321 of the guide member 32 on the right side includes, at the lower end thereof, a pressing surface 3211 extending substantially horizontally. The pressing surface 3211 is opposed to the upper surface near the right end of the label paper 121 and presses the right end of the label paper 121 downward. The guide plate 322 of the guide member 32 on the right side includes, on the left side surface thereof, a guide surface 3221 parallel to the center surface of the label printer 100. The guide surface 3221 is opposed to the right end of the label paper 121 and guides the right end of the label paper 121. The pressing block 311 of the guide member 31 on the left side includes a pressing surface 3111 functioning in the same manner as the pressing surface 3211. The guide plate 312 on the left side includes, on the right side surface thereof, a guide surface 3121 that functions in the same manner as the guide surface 3221.

A procedure until the label paper 121 drawn out from the label paper roll 12 attached to the supply shaft 6 is projected from the front wall 203 of the label printer 100 through the printing unit 10 is explained with reference to FIGS. 4 to 7. It is assumed that, before the label paper 121 is attached, the ink ribbon is already attached through the thermal head 11 of the printing unit 10.

First, as illustrated in FIG. 4, the printing unit 10 is opened to the retracted position, the fixing screw 34 is loosened, and the pair of guide members 31 and 32 is opened to the left and the right. At this time, the pair of guide members 31 and 32 is opened slightly wider than the width of the label paper 121. As illustrated in FIG. 5, the distal end of the label paper 121 is fed forward to between the printing unit 10 and the platen roller 13. The left and right ends of the label paper 121 are inserted below the pressing blocks 311 and 321 of the left and right pair of guide members 31 and 32. Consequently, the left and right ends of the label paper 121 is pressed downward by the pressing surfaces 3111 and 3211 of the pressing blocks 311 and 321.

Thereafter, as illustrated in FIG. 6, the distal end of the label paper 121 is drawn out to the front of the front wall 203 of the housing 2. The pair of guide members 31 and 32 is moved in a direction for closing the pair of guide members 31 and 32 toward the left and right ends of the label paper 121. The guide surfaces 3121 and 3221 of the left and right guide plates 312 and 322 are brought into contact with the left and right ends of the label paper 121. At this time, the guide surfaces 3121 and 3221 of the left and right guide plates 312 and 322 may not be brought into contact with the left and right ends of the label paper 121 to provide small gaps between the label paper 121 and the guide members 31 and 32. In this way, after the width between the pair of guide members 31 and 32 is adjusted, the fixing screw 34 is tightened to fix the pair of guide members 31 and 32 on the horizontal wall 204 of the housing 2.

Further, thereafter, as illustrated in FIG. 7, the printing unit 10 is turned to the actuation position to hold the label paper 121 and the ink ribbon between the thermal head and the platen roller 13. In this state, a conveying force can be applied to the label paper 121 from the platen roller 13. The label paper 121 can be drawn out from the label paper roll 12.

Finally, the fixing plate 9 is turned from the fixing release position illustrated in FIG. 7 to the fixing position illustrated in FIG. 1, the distal end of the feeding shaft 7 is inserted into the receiving hole 902, the distal end of the winding shaft 8 is inserted into the receiving hole 903, and the lock lever 101 of the printing unit 10 is inserted through the insertion hole 904. The lock lever 101 is turned to lock the printing unit 10 in the actuation position.

Figure 8:
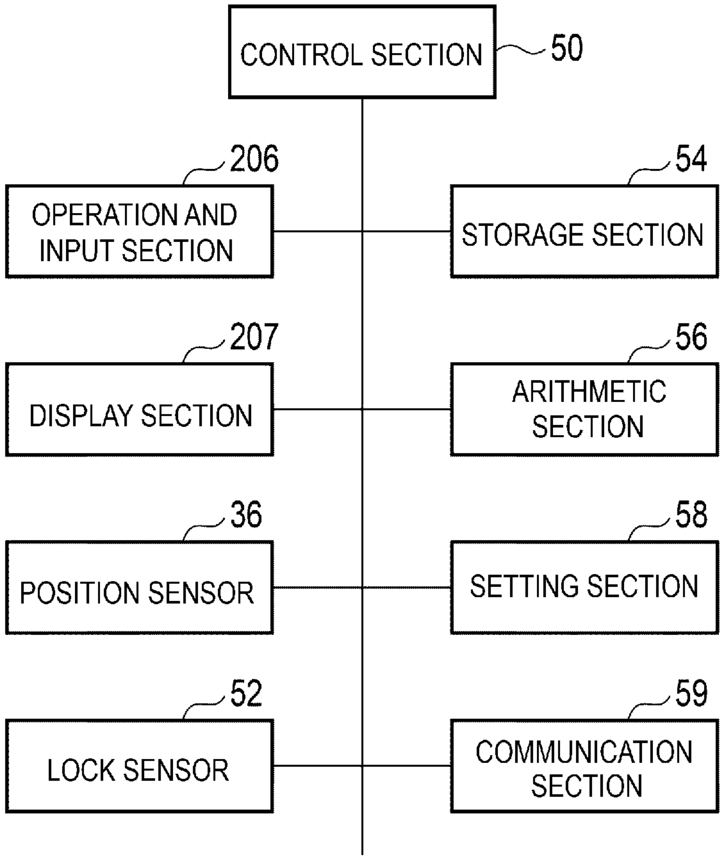
FIG. 8 is a block diagram illustrating a control system of the label printer.

FIG. 8 is a block diagram illustrating a control system of the label printer 100 explained above.

The label printer 100 includes a control section 50, the operation and input section 206, the display section 207, the position sensor 36, a lock sensor 52, a storage section 54, an arithmetic section 56, a section setting 58, and a communication section 59.

The control section 50 includes a CPU that controls an operation of the label printer 100. The width of the label paper 121 used in the label printer 100 is input to the operation and input section 206. The position sensor 36 detects the position in the width direction of the pair of guide members 31 and 32. The lock sensor 52 senses that the lock lever 101 of the printing unit 10 is turned to the lock position. The lock sensor 52 is an example of the fixing sensor described in the claims of this application.

The storage section 54 stores a voltage value output by the position sensor 36 if the pair of guide members 31 and 32 is disposed in the fully opened position and a voltage value output by the position sensor 36 if the pair of guide members 31 and 32 is disposed in the fully closed position. The fully closed position of the pair of guide members 31 and 32 is an example of the first position described in the claims of this application. The voltage value output by the position sensor 36 if the pair of guide members 31 and 32 is disposed in the fully opened position is an example of the first output signal described in the claims of this application. The fully closed position of the pair of guide members 31 and 32 is an example of the second position described in the claims of this application. The voltage value output by the position sensor 36 if the pair of guide members 31 and 32 is disposed in the fully closed position is an example of the second output signal described in the claims of this application.

The arithmetic section 56 creates, based on the two voltage values stored in the storage section 54, a linear function indicating a characteristic of the position sensor 36. The setting section 58 substitutes an output of the position sensor 36 in the linear function created by the arithmetic section 56 to determine width of the label paper 121 and sets a printing start position in the width direction for the label paper 121. The setting section 58 is also an example of the correcting section described in the claims of this application.

The communication section 59 transmits and receives various data to and from external equipment such as a host computer.

A setting method for the printing start position by the label printer 100 is explained with reference to FIGS. 9 and 10. Since the label printer 100 in this embodiment conveys the label paper 121 at center reference, it is assumed that a setting reference for the printing start position is the guide surface 3221 of the guide plate 322 of the guide member 32 that guides the right end in the width direction of the label paper 121.

Figure 9:
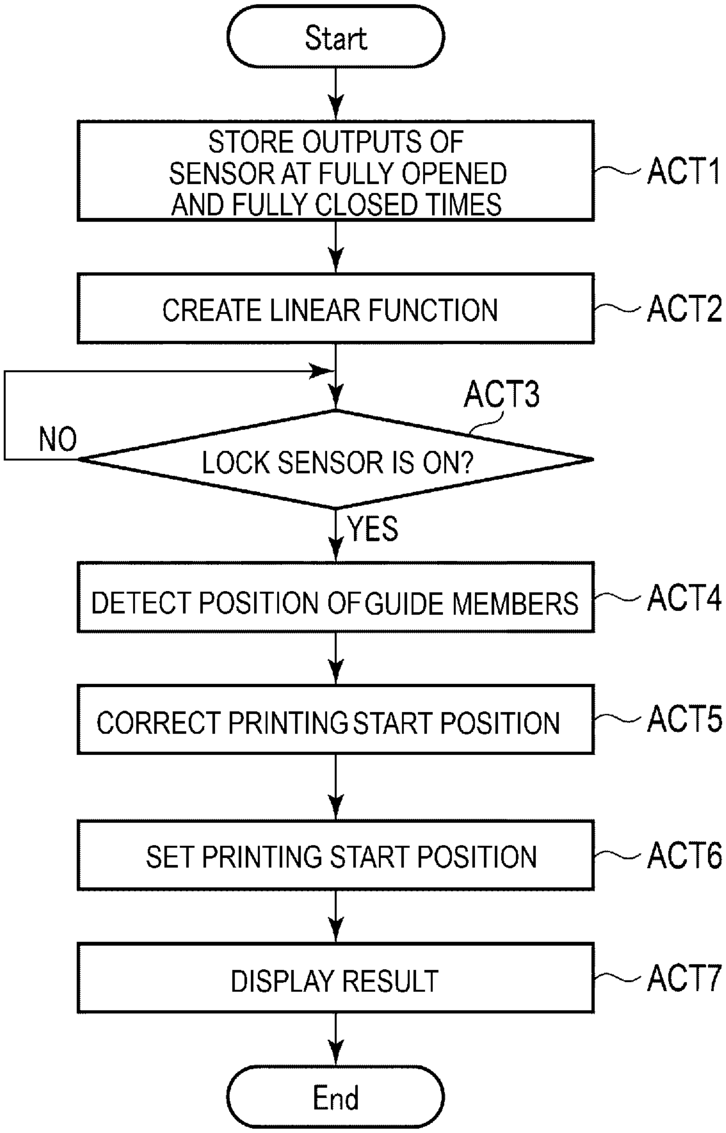
FIG. 9 is a flowchart for explaining a setting operation for a printing start position in the label printer.

Before the label paper roll 12 is attached, in ACT 1 in FIG. 9, the control section 50 of the label printer 100 detects, in advance, voltage values output by the position sensor 36 if the pair of guide members 31 and 32 is disposed in the fully opened position where the pair of guide members 31 and 32 is opened to the maximum and the fully closed position where the pair of guide members 31 and 32 is brought close to each other until the distance between the pair of guide members 31 and 32 is minimized and stores the two voltage values in the storage section 54.

In ACT 2, the control section 50 creates, based on the respective positions in the width direction at the time when the pair of guide members 31 and 32 is disposed in the fully opened position and the fully closed position and the two voltage values stored in the storage section 54 in ACT 1, with the arithmetic section 56, a linear function indicating a characteristic of the position sensor 36. The linear function created in ACT 2 is stored in the storage section 54. The positions in the width direction at the time when the pair of guide members 31 and 32 is fully opened and fully closed are positions in the width direction of the slider pin 362 of the position sensor 36 and are values including an individual difference and a detection error of the position sensor 36.

Figure 10:
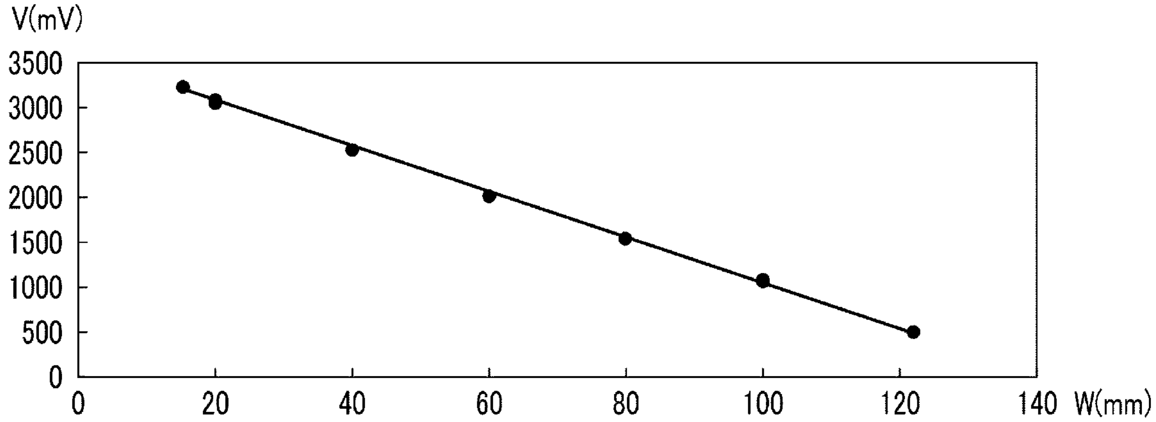
FIG. 10 is a graph illustrating an example of a linear function created in ACT 2 in FIG. 9.

For example, as illustrated in FIG. 10, if a position of the slider pin 362 of the position sensor 36 at the time when the pair of guide members 31 and 32 is disposed in the fully closed position is 15.5 mm, a voltage value detected by the position sensor 36 at that time is 3200 mV, a position of the slider pin 362 of the position sensor 36 at the time when the pair of guide members 31 and 32 is disposed in the fully opened position is 122 mm, and a voltage value detected by the position sensor 36 at that time is 500 mV, the linear function created by the arithmetic section 56 in ACT 2 can be represented by a straight line connecting the two points. That is, if the voltage value detected by the position sensor 36 is represented as V (mV) and the position of the slider pin 362 of the position sensor 36 is represented as W (mm), the linear function at this time is $W=-0.04V+141.72$. The position in the width direction of the slider pin 362 represents the position in the width direction of the pair of guide members 31 and 32.

The label printer 100 can cause the storage section 54 to store, in advance, the widths of usable several kinds of label paper 121. An operator attaches the label paper roll 12 to the supply shaft 6 as explained above and disposes, according to the procedure explained with reference to FIGS. 4 to 7, the label paper 121 drawn out from the label paper roll 12 between the printing unit 10 and the platen roller 13.

After ACT 2, if the label paper roll 12 is attached by the operator and the control section 50 senses, via the lock sensor 52, that the lock lever 101 is turned to the lock position (YES in ACT 3), in ACT 4, the control section 50 detects the position in the width direction of the pair of guide members 31 and 32 via the position sensor 36. At this time, the control section 50 substitutes the voltage value detected via the position sensor 36 in the linear function created in ACT 2 and detects the position in the width direction of the pair of guide members 31 and 32.

A gap of approximately 1 mm often occurs between the pair of guide members 31 and 32, and the label paper 121 which is detected in ACT 4. Therefore, assuming that a gap of 0.5 mm is present on each of the left and the right between the label paper 121 and the pair of guide surfaces 3121 and 3221, in ACT 5, the control section 50 corrects the printing start position to be shifted 0.5 mm in the paper center direction. For example, if the distance between the guide surfaces 3121 and 3221 which is detected in ACT 4, is 121 mm, the width of the label paper 121 attached to the label printer 100 is 120 mm. Gaps of 1 mm occur between the label paper 121 and the pair of guide surfaces 3121 and 3221.

That is, the control section 50 controls the setting section 58 based on a position obtained by adding the correction in ACT 5 to the position in the width direction of the pair of guide members 31 and 32 detected in ACT 4 and, in ACT 6, sets a printing start position in the width direction for the label paper 121. The printing start position is the position at the right end in the width direction of a printing region based on the guide surface 3221 of the guide plate 322 of the guide member 32 on the right side.

After setting the printing start position in ACT 6, in ACT 7, the control section 50 displays setting information to the operator via the display section 207. The information displayed via the display section 207 at this time is information concerning the position in the width direction of the pair of guide members 31 and 32, information concerning the printing start position set in ACT 6, and the like. The information concerning the printing start position includes a shift amount in the case in which the printing start position is shifted in the width direction. The information to be displayed can also be transmitted to external equipment via the communication section 59.

The operator can input a shift amount in the width direction of the printing start position via the operation and input section 206. In this case, for example, if the operator inputs 10 mm as the shift amount in the width direction, the operator can shift the printing start position 10 mm in the left direction from a printing start reference, that is, the guide surface 3221 of the guide plate 322 of the guide member 32 on the right side.

Effects of the embodiment explained above are explained below.

According to this embodiment, based on an output of the position sensor 36 at the time when the pair of guide members 31 and 32 is disposed in the fully opened position and an output of the position sensor 36 at the time when the pair of guide members 31 and 32 is disposed in the fully closed position, a linear function indicating a relation between the outputs of the position sensor 36 and the position in the width direction of the pair of guide members 31 and 32 is created and the position in the width direction of the pair of guide members 31 and 32 is detected using the linear function. Therefore, according to this embodiment, it is possible to correct a lot or individual error or fluctuation of the position sensor 36 and more accurately detect the position in the width direction of the pair of guide members 31 and 32. It is possible to securely set a printing start position in the width direction for the label paper 121.

Figure 11:
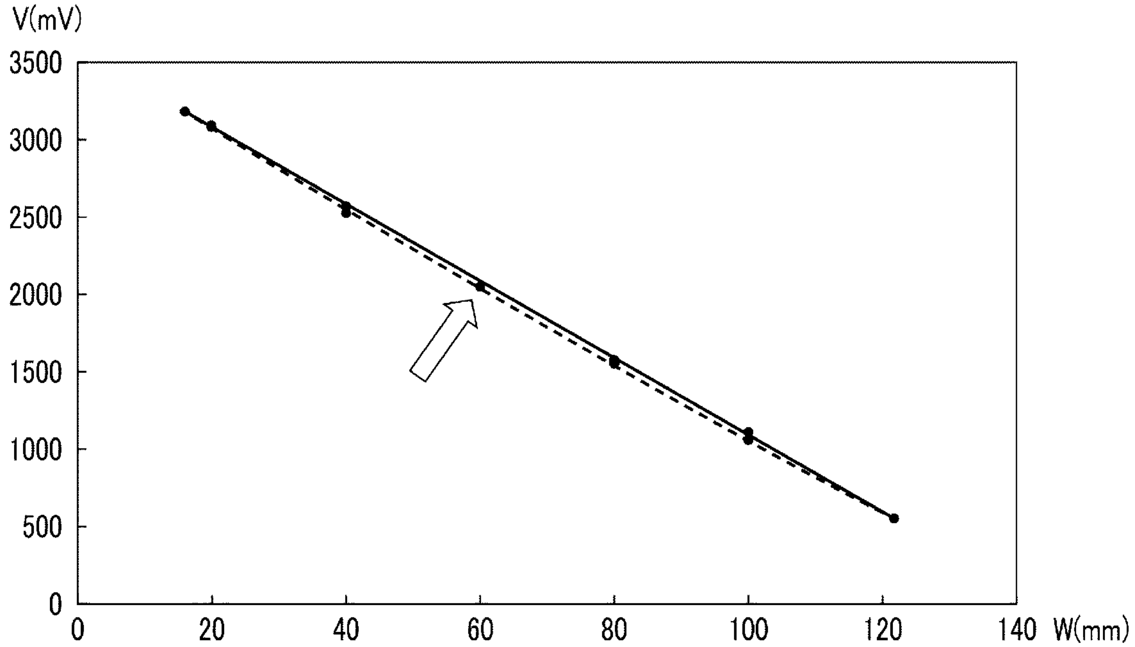
FIG. 11 is a graph illustrating another example of the linear function created in ACT 2 in FIG. 9.

In this embodiment, if the linear function serving as a control reference is created, sensor outputs at the time when the pair of guide members 31 and 32 is fully opened and at the time when the pair of guide members 31 and 32 is fully closed are sampled. Therefore, it is possible to minimize the influence of a characteristic error specific to the position sensor 36. It is possible to more accurately detect the position in the width direction of the pair of guide members 31 and 32. In the embodiment explained above, the data at the two points of the fully opened position and the fully closed position are sampled to create the linear function. However, for example, data at three points including an intermediate point illustrated in FIG. 11 may be sampled to create two linear functions. In this case, it is possible to further reduce the influence of the characteristic error specific to the position sensor 36. Further, in this embodiment, the linear function is created as the control reference. However, data at more points in the width direction may be sampled to create a control table.

The label printer 100 in this embodiment includes, in close contact with the rear of the printing unit 10, the conveyance guide unit 30 including the pair of guide members 31 and 32. The conveyance guide unit 30 includes the position sensor 36 adjacent to the pair of guide members 31 and 32. Therefore, according to this embodiment, it is possible to detect a conveyance position in the width direction of the label paper 121 immediately before the printing unit 10 in the conveyance direction of the label paper 121. There is no concern that the label paper 121 deviates in the width direction and the printing start position deviates in a period until printing is performed after the conveyance position is detected. Therefore, according to this embodiment, even if a skew occurs in the label paper 121, it is possible to prevent deviation from occurring in the printing start position in the width direction.

In this embodiment, after the label paper roll 12 is set in the label printer 100 and the printing unit 10 is fixed in the actuation position, the data of the fully opened position and the fully closed position of the pair of guide members 31 and 32 are sampled to create the linear function serving as the control reference. Therefore, it does not occur that the pair of guide members 31 and 32 moves after the linear function creation to cause an error. Therefore, according to this embodiment, it is possible to accurately set the printing start position in the width direction.

In this embodiment, if the operator holds the label paper 121 between the pair of guide members 31 and 32 and determines a conveyance position in the width direction, even if gaps of approximately 1 mm occur between the guide surfaces 3121 and 3221 of the pair of guide members 31 and 32 and the end portions of the label paper 121, it is possible to correct the printing start position in the width direction. If the operator desires to intentionally change the printing start position, the operator can set a shift amount of the printing start position via the operation and input section 206.

In this embodiment, the arm 35 is fixed to the guide member 32 on the right side and the slider pin 362 of the position sensor 36 is coupled to the distal end of the arm 35. Therefore, the position in the width direction of the pair of guide members 31 and 32 can be directly detected by the position sensor 36. It is possible to markedly reduce a detection error.

In the embodiment explained above, the data at the time when the pair of guide members 31 and 32 is disposed in the fully opened position and the fully closed position are sampled to create the linear function serving as the control reference. However, data to be sampled in order to create the linear function only has to be a plurality of data at the time when the pair of guide members 31 and 32 is disposed in different positions. The number of data to be sampled and the position in the width direction can be optionally set.

In the embodiment explained above, the printing start position is corrected in ACT 5 in FIG. 9 assuming that the gaps of approximately 1 mm are present between the label paper 121 and the pair of guide members 31 and 32. However, a difference between the width of the label paper 121 stored in advance in the storage section 54 and the width of the pair of guide members 31 and 32 detected in ACT 4 may be calculated and, if the difference does not exceed a preset threshold, the printing start position in the width direction for the label paper 121 may be set based on the width of the pair of guide members 31 and 32 detected in ACT 4. If the difference does not exceed the preset threshold, the operator may set a printing start position based on the width of the label paper 121 input in advance by the operator. If the difference exceeds the preset threshold, the printing start position may be corrected based on the difference.

While certain embodiment have been described, this embodiment has been presented by way of example only, and is not intended to limit the scope of invention. Indeed, the novel apparatus and methods described herein may be embodied in a variety of other forms; furthermore, various omissions, substitutions and changes in the form of the apparatus and methods described herein may be made without departing from the spirit of the inventions. The accompanying claims and their equivalents are intended to cover such forms or modifications as would fall within the scope and spirit of the inventions.

What is claimed is:

1. A printer, comprising:

a conveyance guide configured to guide an end portion of a print medium in a width direction orthogonal to a conveyance direction and determine a conveyance position in the width direction of the print medium, the conveyance guide movable in the width direction;

a printing component configured to print on the print medium guided by the conveyance guide and conveyed in the conveyance direction;

a position sensor configured to output a signal, which changes in proportion to a position in the width direction of the conveyance guide, and to detect the position in the width direction of the conveyance guide;

wherein the position sensor comprises a resistor that applies a voltage to both ends of the resistor and is extended in the width direction and a contactor movable in the width direction in a state in which the resistor is conducted, the position sensor outputting a voltage corresponding to a position in the width direction of the contactor, an arithmetic component configured to create, based on a first output signal of the position sensor at a time when the conveyance guide is disposed in a first position in the width direction and a second output signal of the position sensor at a time when the conveyance guide is disposed in a second position different from the first position in the width direction, a linear function indicating a proportional relation between the position in the width direction of the conveyance guide and the output signals of the position sensor;

a setting component configured to calculate, from the output signals of the position sensor, the position in the width direction of the conveyance guide using the linear function created by the arithmetic component and set, based on the calculated position, a printing start position in the width direction by the printing component for the print medium; and a coupling member connected to the contactor and provided integrally with the conveyance guide.

2. The printer according to claim 1, further comprising:

a housing; and a fixing screw for fixing the conveyance guide and the coupling member to the housing with joint fastening.

3. The printer according to claim 2, further comprising a sheet metal fixed to the housing, wherein the position sensor is fixed to the sheet metal.

4. The printer according to claim 1, further comprising:

an input component to which length in the width direction of the print medium is input; and a correcting component configured to calculate, based on the position in the width direction of the conveyance guide calculated by the setting component and the length in the width direction input via the input component, a length in the width direction of a gap between the end portion of the print medium and the conveyance guide and correct, by the gap, the printing start position set by the setting component.

5. The printer according to claim 4, wherein the correcting component compares the calculated length in the width direction of the gap with a preset threshold, if the length in the width direction of the gap exceeds the threshold, corrects the printing start position, and, if the length in the width direction of the gap does not exceed the threshold, does not correct the printing start position.

6. The printer according to claim 4, wherein the conveyance guide includes a pair of guide members configured to guide both ends, of the print medium, in the width direction of the print medium, the pair of guide members movable in the width direction, and the correcting component corrects the printing start position by a half of the calculated length in the width direction of the gap.

7. The printer according to claim 1, wherein the conveyance guide includes a pair of guide members configured to guide both ends, of the print medium, in the width direction of the print medium, the pair of guide members being openable and closable in the width direction, and the arithmetic component creates the linear function using, as the first output signal, an output signal of the position sensor at a time when the pair of conveyance guides is disposed in a fully opened state and using, as the second output signal, an output signal of the position sensor at a time when the pair of conveyance guides is disposed in a fully closed state.

8. The printer according to claim 1, further comprising a fixing sensor configured to sense that the printing component is fixed in an actuation position, wherein the arithmetic component acquires, based on sensing, via the fixing sensor, that the printing component is fixed in the actuation position, the first output signal and the second output signal and creates the linear function.

9. A method, comprising:

guiding an end portion of a print medium with a conveyance guide in a width direction orthogonal to a conveyance direction and determining a conveyance position in the width direction of the print medium, the conveyance guide movable in the width direction;

printing on the print medium guided by the conveyance guide and conveyed in the conveyance direction;

outputting a signal from a position sensor, which changes in proportion to a position in the width direction of the conveyance guide, and detecting the position in the width direction of the conveyance guide;

creating, based on a first output signal of the position sensor at a time when the conveyance guide is disposed in a first position in the width direction and a second output signal of the position sensor at a time when the conveyance guide is disposed in a second position different from the first position in the width direction, a linear function indicating a proportional relation between the position in the width direction of the conveyance guide and the output signals of the position sensor; and calculating, from the output signals of the position sensor, the position in the width direction of the conveyance guide using the linear function created by the arithmetic component and set, based on the calculated position, a printing start position in the width direction by the printing component for the print medium, wherein the conveyance guide comprises a pair of guide members configured to guide both ends, of the print medium, in the width direction of the print medium, the pair of guide members being openable and closable in the width direction, and wherein the arithmetic component creates the linear function using, as the first output signal, an output signal of the position sensor at a time when the pair of conveyance guides is disposed in a fully opened state and using, as the second output signal, an output signal of the position sensor at a time when the pair of conveyance guides is disposed in a fully closed state.

10. The method according to claim 9, wherein the position sensor comprises a resistor and a contactor movable in the width direction in a state in which the resistor is conducted, the method further comprising:

applying a voltage to both ends of the resistor corresponding to a position in the width direction of the contactor.

11. The method according to claim 9, further comprising:

sensing that the printing component is fixed in an actuation position; and acquiring, based on sensing, that the printing component is fixed in the actuation position, the first output signal and the second output signal and creating the linear function.

12. The method according to claim 9, further comprising:

inputting a length in the width direction of the print medium; and calculating, based on the position in the width direction of the conveyance guide calculated and the length in the width direction input, a length in the width direction of a gap between the end portion of the print medium and the conveyance guide and correcting, by the gap, the printing start position set.

13. The method according to claim 12, further comprising:

comparing the calculated length in the width direction of the gap with a preset threshold; and if the length in the width direction of the gap exceeds the threshold, correcting the printing start position; and if the length in the width direction of the gap does not exceed the threshold, not correcting the printing start position.

14. The method according to claim 12, further comprising:

guiding both ends in the width direction of the print medium with a pair of guide members of the conveyance guide, the pair of guide members movable in the width direction; and correcting the printing start position by a half of the calculated length in the width direction of the gap.

15. A label printer, comprising:

a print head;

a conveyance guide configured to guide an end portion of a print medium in a width direction orthogonal to a conveyance direction and determine a conveyance position in the width direction of the print medium, the conveyance guide movable in the width direction;

a printing component configured to print on the print medium guided by the conveyance guide and conveyed in the conveyance direction;

a position sensor configured to output a signal, which changes in proportion to a position in the width direction of the conveyance guide, and to detect the position in the width direction of the conveyance guide;

wherein the position sensor includes a resistor that applies a voltage to both ends of the resistor and is extended in the width direction and a contactor movable in the width direction in a state in which the resistor is conducted, the position sensor outputting a voltage corresponding to a position in the width direction of the contactor, an arithmetic component configured to create, based on a first output signal of the position sensor at a time when the conveyance guide is disposed in a first position in the width direction and a second output signal of the position sensor at a time when the conveyance guide is disposed in a second position different from the first position in the width direction, a linear function indicating a proportional relation between the position in the width direction of the conveyance guide and the output signals of the position sensor;

a setting component configured to calculate, from the output signals of the position sensor, the position in the width direction of the conveyance guide using the linear function created by the arithmetic component and set, based on the calculated position, a printing start position in the width direction by the printing component for the print medium; and a coupling member connected to the contactor and provided integrally with the conveyance guide.

* * * * *